United States Patent [19]

Chance et al.

[11] Patent Number: 4,654,184

[45] Date of Patent: Mar. 31, 1987

[54] SYSTEM AND METHOD OF OPERATING TOROIDAL MAGNETIC CONFINEMENT DEVICES

[75] Inventors: Morrell S. Chance, Princeton Jct.; Stephen C. Jardin; Thomas H. Stix, both of Princeton, all of N.J.; Ray C. Grimm, deceased, late of Yowie Bay, Australia, by Elaine Grimm, administratrix; Janardhan Manickam, Lawrenceville; Michio Okabayashi, Princeton, both of N.J.

[73] Assignee: The United States of America as represented by the United States Department of Energy, Washington, D.C.

[21] Appl. No.: 645,725

[22] Filed: Aug. 30, 1984

[51] Int. Cl.$^4$ .................................................. G21B 1/00
[52] U.S. Cl. ..................................................... 376/133
[58] Field of Search ........................ 376/133, 142, 121

[56] References Cited

U.S. PATENT DOCUMENTS 4,330,864  5/1982  Ohyabu ............................. 376/133

OTHER PUBLICATIONS

Mercier, "The Magneto Hydrodynamic Approach to the Problem of Plasma Confinement in Closed Magnetic Configurations," *Lectures in Plasma Physics*, pp. 138–140, 1974.
Coppi et al., "Ideal-MHD Stability of Finite-Beta Plasmas", *Nuclear Fusion* 19, pp. 715–725, 1979.
Miller et al., "Shape Optimization of Tokamak Plasmas to Localized MHD Modes", *Phys. Rev. Lett.* 43, No. 11, pp. 765–768, Sep. 1979.
Machida, "Exp. Observ. of MHD Instabilities in the High-Beta Tokamak Torus-II," DOE/ET/53016-80, 1982.
McGuire et al., "Study of High Beta Pressure Driven Modes in PDX", PPPL-1946, Oct. 1982.
Kellman et al., "Stability Analysis of Exp. High Beta Toroidal Plasmas", DOE/ET/53051-54, Jun. 1983.
Manickam et al., "Stability of n=1 Kink Modes in Bean-Shaped Tokamaks", *Phys. Rev. Lett.* vol. 51, No. 21, pp. 1959–1962, No. 2, 1983.
Change et al., "Ballooning Mode Stability of Bean-Shaped Cross Sections for High Beta Tokamak Plasmas," *Phys. Rev. Lett.* vol. 51, No. 21, pp. 1963–1966, Nov. 1983.
Navratil, "Large Aspect Ratio, High-Beta Tokamak Fusion Reactor," DOE/ET/53016-87, 1985.

*Primary Examiner*—Deborah L. Kyle
*Assistant Examiner*—Richard L. Klein
*Attorney, Agent, or Firm*—Jeannette M. Walder; Gustavo Siller, Jr.; Judson R. Hightower

[57] ABSTRACT

For toroidal magnetic confinement devices the second region of stability against ballooning modes can be accessed with controlled operation. Under certain modes of operation, the first and second stability regions may be joined together. Accessing the second region of stability is accomplished by forming a bean-shaped plasma and increasing the indentation until a critical value of indentation is reached. A pusher coil, located at the inner-major-radius side of the device, is engaged to form a bean-shaped poloidal cross-section in the plasma.

24 Claims, 23 Drawing Figures

SYSTEM AND METHOD OF OPERATING TOROIDAL MAGNETIC CONFINEMENT DEVICES

CONTRACTUAL ORIGIN OF THE INVENTION

The U.S. Government has rights in this invention pursuant to Contract No. DE-AC02-76CH03073 between the U.S. Department of Energy and Princeton University.

BACKGROUND OF THE INVENTION

This invention pertains to methods and arrangements for attaining high beta values in plasma confinement devices. More specifically, this invention pertains to methods for accessing the second stability region of operation in toroidal magnetic confinement devices.

The performance of a magnetic confinement device can be expressed by the parameter beta $\beta$, the ratio of the plasma kinetic pressure to the confining pressure of the magnetic field. Beta is a direct measure of the efficiency of the magnetic confinement; that is, high-$\beta$ systems make better use of the confining field than do low-$\beta$ systems. Beta is defined as:

$$\beta_{av} = \frac{2 p_{av}}{B_{av}^2}, \quad (1)$$

where $p_{av} = \int p d\tau / \int d\tau$ and $B_{av}^2 = \int B^2 d\tau / \int d\tau$, the integration being over the plasma volume, where $p_{av}$ is the average plasma pressure and $B_{av}^2/2$ is the average magnetic pressure.

A plasma confined in a magnetic field may be unstable. Various instabilities have been predicted based on ideal single fluid magnetohydrodynamic (MHD) equilibrium and linear stability analyses in axisymmetric toroidal configurations. Potentially unstable MHD modes include: the ballooning modes, the Mercier modes (interchange modes), and external and internal kinks. Of these modes, ballooning and internal kinks are serious obstacles to creating and maintaining stable high-$\beta$ plasmas. Generally, the criteria for ideal MHD instability will depend on specific plasma parameters such as $\beta$, the pressure and safety factor profiles, and the various geometrical shaping factors. Consequently, stable operation has been limited to low betas. This region of operation is referred to as the "first region" of stable operation. Increasing beta beyond the limit of the first region results in operation in the unstable region where deleterious effects of unstable MHD modes are present.

Several studies have been carried out to find environments favorable for suppressing the ballooning instability mode (e.g., A. M. Todd et al., Nucl. Fusion 19 743 (1979)). An empirical shape-optimization by Miller and Moore (Phys. Rev. Lett. 43, 765 (1979)) has shown that a strongly modified dee shaped plasma with an indentation on the inside edge of the plasma (i.e., inwardly concave at the inner-major-radius side) can enhance achievable stable $\beta$ against ballooning for small aspect ratio configurations. Similarly, Mercier (in *Lectures in Plasma Physics*, EURATOM-CEA/CEN/EUR 5/27 e, EURATOM, Luxembourg, 1974) showed that an indented plasma enhanced plasma stability against localized interchange modes.

While the majority of design studies have been performed at low $\beta$, it has also been known that at very large $\beta$, there exists a region of operation where stability to ballooning modes could be regained because of the magnetic well effects produced by the large outward Shafranov shift (e.g., Coppi et al., Nucl. Fusion 19, 715 (1979)). This stable region was called the "second region" of stability and many unsuccessful attempts were made to discover operating scenarios which would make this region accessible from the low-$\beta$ regime. [By accessibility, we mean a demonstration that a method of operation of the device is possible whereby the $\beta$ (or pressure) of the device can be increased continuously from zero to a very large $\beta$ value without passing through the unstable region.] For example, detailed numerical calculations (e.g., Monticello et al., Sherwood Meeting, Austin, Tex., April, 1981) demonstrated that in plasmas with nearly circular cross sections the second stable region occurred only for large aspect ratio configurations and accessibility was not possible.

In addition, the internal kink has been shown to be a prime candidate responsible for enhanced fast-ion loss through "fishbone oscillations", thus limiting the ability to increase $\beta$.

It is therefore an object of the present invention to provide a method and apparatus for forming a magnetically confined plasma.

Another object of the present invention is to provide a method and apparatus for forming a magnetically confined plasma and avoiding plasma MHD instabilities which defeat plasma confinement.

Yet another object of the present invention is to provide a method and apparatus for forming a plasma with an increased beta.

Another object of the present invention is to provide a method and apparatus which makes accessible the second region of stability against ballooning modes.

Still another object of the present invention is to provide a method and apparatus for forming a high-beta plasma having stabilized ballooning and internal-kink modes thereby minimizing fast ion losses.

Additional objects, advantages, and novel features of the invention will be set forth in part in the description which follows, and in part will become apparent to those skilled in the art upon examination of the following or may be learned by practice of the invention.

SUMMARY OF THE INVENTION

The present invention is the first demonstration for toroidal magnetic confinement devices that the second region of stability against ballooning modes can be accessed with controlled operation. Indeed, under certain modes of operation, it has been found the first and second stability regions may be joined together. Accessing the second stability region is essential to obtaining the high beta necessary for commercial fusion reactors. The present invention also demonstrates the ability to simultaneously achieve complete stabilization to the internal (n=1) kink modes.

For toroidal confinement devices, the second region of stability may be accessed by the following scenario: first, modifying the shape of the plasma until it has a bean-shaped poloidal cross-section (by bean-shaped we mean indented or inwardly concave at the inner-major-radius side). Second, operating the device in the first region of stability while further indenting the small-major radius side of the cross-section. When the device is being operated in the first region of stability, $\beta$ must be kept below the threshold for instability. There are several ways $\beta$ can be maintained below the threshold for instability, for example: controlling plasma pressure, p, while keeping magnetic field, B, constant; controlling magnetic field B while maintaining plasma pressure constant; or some combination of both. As the indentation is increased, a critical value is reached. This critical value indicates the point at which the second stability region is accessed. Third, after the second stability region has been accessed, $\beta$ can be increased significantly, to well over 20%. Another feature of the second region of stability is the fact that once large $\beta$s are attained, the indentation can be relaxed.

An alternate method of accessing the second region of stability is as follows. First the magnetic field would be applied to the device. Then the bean-shaped plasma would be formed. The bean-shaped cross-section would be chosen such that the indentation is at least as large as the critical value. Then the beta would be increased to the desired value for operation. Since operation is in the region where both first and second regions are joined, there are no problems with balloon instabilities. After the desired beta is attained (such as by heating the plasma) then the indentation can be relaxed.

The method of the present invention has been demonstrated to provide stability against ballooning modes and against internal kink modes. A theoretical analysis of the stability against ballooning modes is contained in M. S. Chance et al., "Ballooning Mode Stability of Bean-Shaped Cross Sections for High-$\beta$ Tokamak Plasmas", Phys. Rev. Lett. 51 1963 (November 1983), which is incorporated herein by reference. A theoretical analysis of the stability against internal kinks is contained in J. Manickam et al., "Stability of n=1 Kink Modes in Bean-Shaped Tokamaks", Phys. Rev. Lett. 51, 1959 (November 1983), which is incorporated herein by reference. It has also been found that for the method of this invention, the Mercier modes are even more stable than in conventional tokamaks (especially with the strong minimum-B property of the bean shaping) and the gross stability of the external kink modes is similar to those of conventional tokamaks.

BRIEF DESCRIPTION OF THE DRAWINGS

FIG. 6 shows a stability boundary to infinite-n ballooning modes at fixed indentation, as a function of aspect ratio, R/a.

DETAILED DESCRIPTION OF THE PREFERRED EMBODIMENT

The present invention pertains to optimizing the magnetic field utilization factor, $\beta$, for toroidally confined plasmas such as those found in tokamak devices.

Figure 1A:
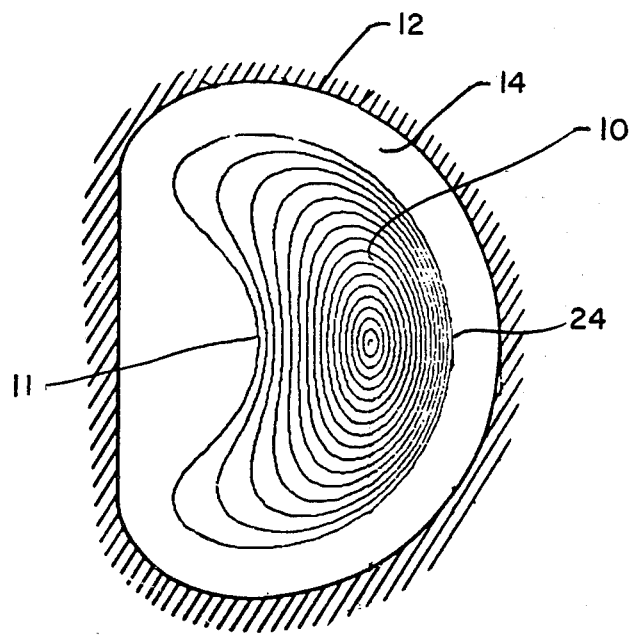
FIGS. 1a and 1b are cross-sectional views of bean-shaped plasmas according to the present invention.

Referring now to FIG. 1a, a tokamak plasma 10 is contained within an evacuated conductive shell or containment vessel 12. A vacuum region 14 is located between the outer plasma and inner containment vessel surfaces, respectively. A line 16 indicates the vertical centerline of the toroidal containment chamber 12.

Figure 1B:
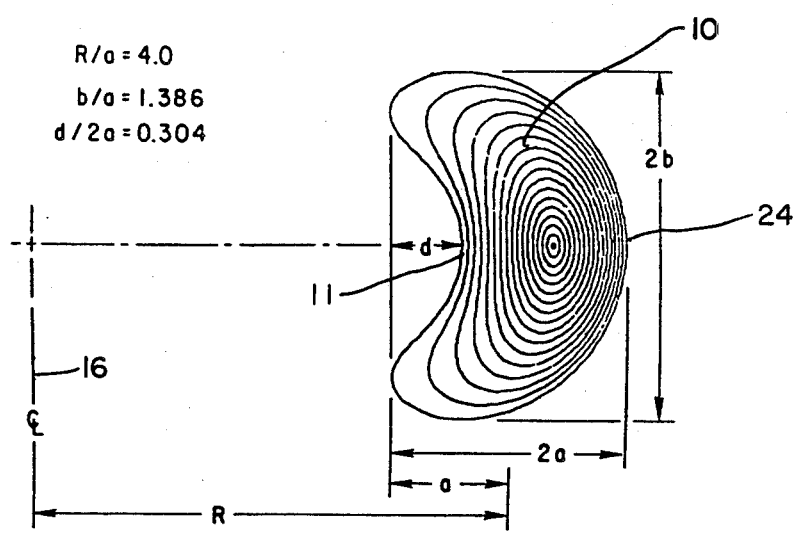

With reference to FIGS. 1a, 1b, the present invention provides increased magnetic field utilization factor, $\beta$, (averaged over the total plasma volume) by indenting the inboard side 11 of the poloidal minor cross section of tokamak plasma 10. As can be seen in FIG. 1, this identation deforms a previously circular or Dee-shaped plasma into a bean shape.

In FIG. 1 aspect ratio is defined as R/a, the ratio of toroidal radius to poloidal radius; elongation of the plasma as b/a; and indentation as d/2a. The particular bean shape shown is for particular values: R/a=4.0, b/a=1.386, and d/2a=0.304. As will be shown later, this value of d/2a corresponds to the critical value for that aspect ratio and the plasma profiles defined in FIGS. 3a–3c.

According to the present invention, bean shapes can exhibit strong local magnetic shear and short connection lengths and can, under certain modest conditions, make accessible the second region of stability against ballooning modes.

Given the relation $\bar{B} = \nabla\phi \times \nabla\psi + R_0 g\nabla\phi \equiv \nabla\gamma \times \nabla\psi$, $\bar{J} \times \bar{B} = \nabla p$, and $\nabla \times \bar{B} = \bar{J}$, the Grad-Shafranov equation takes the form $$\nabla \cdot x^{-2} \nabla \psi = \bar{J} \cdot \nabla \phi = -(p' + R_0^2 gg'/x^2). \tag{2}$$

The poloidal flux within a surface of constant $\psi$ is $2\pi\psi$, x is the major radius, $\phi$ is the azimuthal angle in the cylindrical coordinates (x, $\phi$, z), and primes denote differentiation with respect to $\psi$. Equation (2) is solved by use of a flux coordinate code [J. DeLucia, S. C. Jardin, and A. M. M. Todd, J. Comput. Phys. 37, 183 (1980)] in the fixed-boundary mode, specifying the shape of the plasma boundary. The shape was given by the parametric "bean" equations:

$$x = \bar{x} + \rho \cos\gamma, \quad z = E\rho \sin\gamma, \tag{3}$$

where $\rho = A(1 + B \cos t)$, $\gamma = C \sin t$, and $0 \leq t \leq 2\pi$ so that $-C \leq \gamma \leq C$. Given A, B, C, and E the aspect ratio is fixed by the choice of $\bar{x}$. The bean-shape of FIG. 1 is obtained by setting C=97°, and E=0.895, resulting in R/a=4.0, b/a=1.386, and d/2a=0.304. The indentation parameter, d/2a, is adjusted in part by changing C. The values of these parameters can be chosen to simulate the shapes a plasma will attain for a particular experiment.

BALLOONING STABILITY THEORY

Ballooning Modes and Local Shear

An important feature of conventionally shaped tokamak plasmas with circular or nearly circular cross sections is the beneficial averaged magnetic well which is formed as the result of the equilibrium shift of the magnetic axis. In a bean-shaped plasma, even at low pressure, a line or force spends most of its life at values of major radius smaller than the magnetic axis major radius. Because $dl \sim xd\phi$ and $B \cdot 1/x$, bean-shaping can easily make $U \equiv \oint dl/B$ smaller on the outer surfaces than on the magnetic axis. Together with finite shear, this feature tends to stabilize interchange modes which are constrained to be localized within a surface and constant along a field line. If this last constraint is relaxed, the plasma may be susceptible to ballooning where the perturbation can adjust itself to be large where the well is weak or nonexistent and to be small elsewhere. If the stabilizing effect of the magnetic field tension can be overcome by such a perturbation, then the plasma becomes unstable. These effects are contained in the ballooning equation [described in Dobrott D., Nelson, D. B., Greene, J. M., Glasser, A. H., Chance, and M. S., Frieman, E. A., Phys. Rev. Lett. 39 (1977) 943 and J. W. Connor, R. J. Hastie, and J. B. Taylor, Phys. Rev. Lett 40 (1978) 396]:

$$\underline{B} \cdot \nabla \left( \frac{|\nabla \alpha|^2}{B^2} \underline{B} \cdot \nabla \Phi \right) + 4\pi p^1 K_\omega \Phi + \rho \omega^2 \frac{|\nabla \alpha|^2}{B^2} \Phi = 0 \quad (4)$$

where $$\underline{B} = \nabla \phi \times \nabla \psi + R_o g \nabla \phi = \nabla \alpha \times \nabla \psi,$$

$$K_\omega = \frac{1}{2\pi} \frac{\underline{K} \cdot \underline{B} \times \nabla \alpha}{B^2},$$

$$\underline{K} = \frac{\underline{B}}{B} \cdot \frac{\nabla B}{B}.$$

The first term in equation 4 represents the field tension, the second the potentially destabilizing combination of pressure gradient and magnetic curvature, and the third term stems from fluid inertia. A detailed study of this mode shows that the connection length and the local shear play important roles, Greene, J. M. and Chance, M. S., Nucl. Fusion 21 (1981) 453. As set forth in Green, J. M. and Johnson, J. L., Phys. Fluids 10 (1968) 729, the local shear can be written as $$S = -\underline{F} \cdot \nabla \times \underline{F}, \text{ where } F \equiv \frac{\underline{B} \times \nabla \psi}{|\nabla \psi|^2} \text{ or} \quad (5)$$

$$S = -\underline{B} \cdot \nabla \left( \frac{\nabla \alpha \cdot \nabla \psi}{|\nabla \psi|^2} \right) = \underline{B} \cdot \nabla I$$

$$= \frac{R_o}{J} \left[ \left( \frac{Jg}{x^2} \right)^1 + \frac{\delta}{\delta \theta} \left( \frac{\nabla \psi}{|\nabla \psi|^2} \cdot \nabla \theta \frac{Jg}{x^2} \right) \right]$$

where $$J \equiv (\nabla \psi \times \nabla \theta \cdot \nabla \phi)^{-1}.$$

Since $$q(\psi) = (R_o/2\pi) \oint gJ/x^2 \, d\theta, \text{ then}$$

$$\frac{1}{2\pi} \oint SJd\theta = q'(\psi),$$

so that the local shear, S, is composed of an averaged global shear, $q'(\psi)$, and a residual oscillatory part. The solution of this equation is discussed in Dobrott, D., et al., and Connor, J. W., et al. cited earlier.

Figure 2A:
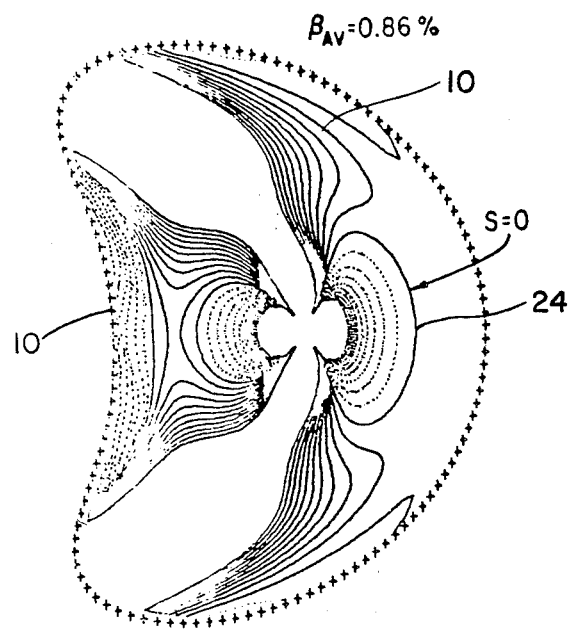
FIGS. 2a through 2d are contour plots of the local shear and normal curvature showing the effect of increasing indentation and plasma beta.

In a conventional tokamak the residual part of the local shear S can be negative on the outer side (24 in FIG. 1) of the plasma major radius where the poloidal field is usually the strongest. It can, in fact, be so negative that S can vanish there, as shown in FIG. 2a which shows contours of equal shear for a tokamak plasma. This condition promotes ballooning instabilities because the vanishing of S is the condition that surfaces containing both B and $\nabla \psi$ exist and, thus, the local interchange of magnetic field lines can be most easily realized there. This phenomenon is difficult to prevent in the conventional tokamak. However, a strong outward shift of the magnetic axis can further strengthen the poloidal magnetic field on the outside and cause the vanishing points of S to move away from the destabilizing region. This shift may be realized by increasing the pressure, but the onset of the instability usually occurs before the stabilization due to local shear and/or shortened connection length takes place. Another route to stability, exploited here, is to indent the plasma at the inner major radius so that the effective shift of the axis is present even at low $\beta$. Further increase of the pressure enhances the shift even more, then renders the plasma immune to the instability.

Figure 2B:
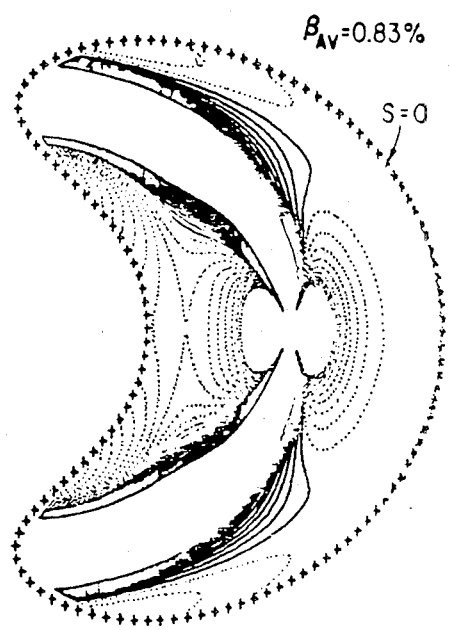
Figure 2C:
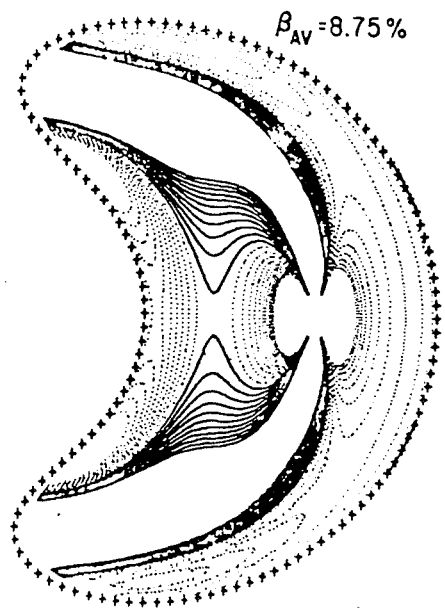

Contours of constant local shear in the neighborhood of S=0 are shown in FIG. 2a for a moderately indented low-theoretically modelled plasma. There the local shear is zero or weak in the outer region of the plasma. Increasing the pressure at this indentation causes instability at about $\beta \sim 2.6\%$. A stronger indentation as shown in FIG. 2b causes the S=0 contour to move further out. In this case, even though the shear is still weak at low $\beta$ [FIG. 2(b)], an increase in pressure shown in FIG. 2(c) strengthens the local shear at large major radius, preserving stability by a self-healing process.

Figure 2D:
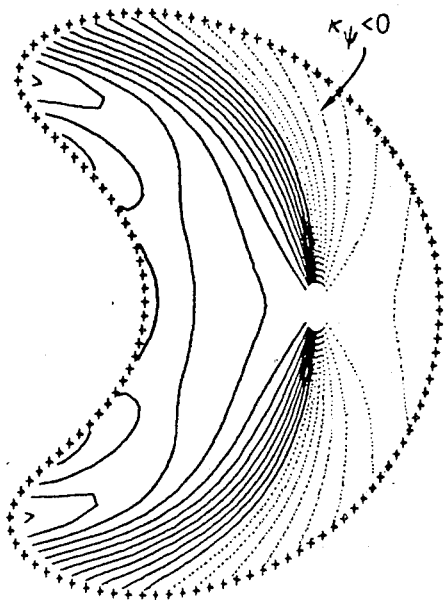

Stabilization due to the shortened connection length of an indented plasma is also effective here. The strong poloidal field at the outside of the torus due to the indentation and finite pressure causes the magnetic field lines to move rapidly through the bad curvature region, spending longer at the tips of the bean where the normal curvature is favorable. As shown in FIG. 2d, there is a reduction of the dangerous region where the normal curvature is negative.

Figure 4:
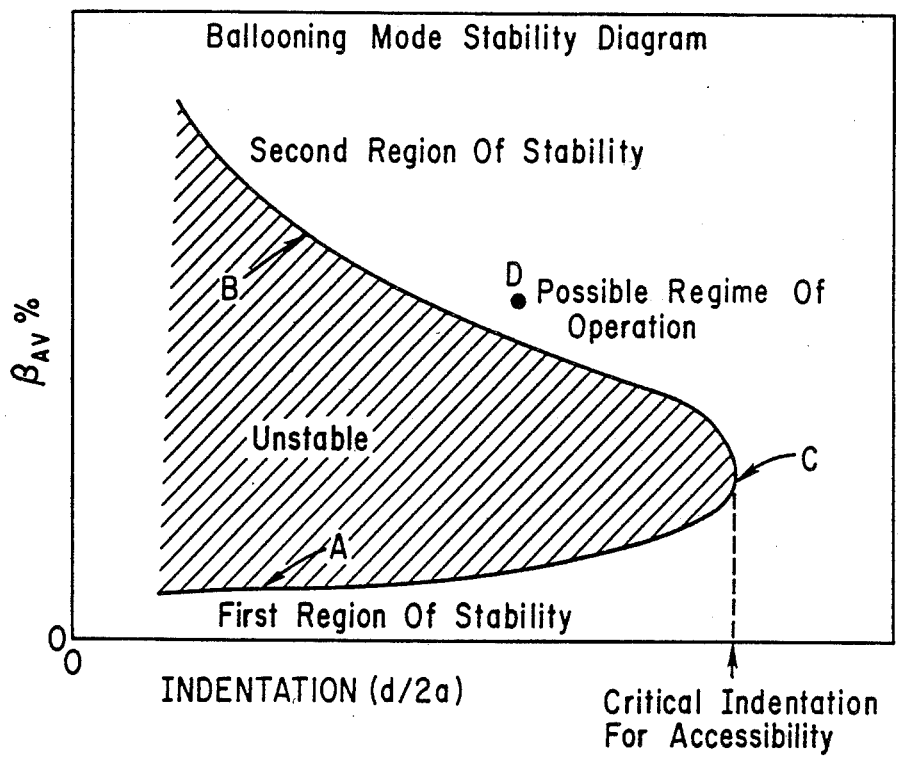
FIG. 4 shows a qualitative sketch of the boundary for stability against infinite-n ballooning modes as a function of plasma indentation and plasma beta.

Indentation and Accessibility to Very High-$\beta$:

The scenario for the application for this invention is depicted schematically in FIG. 4, which shows stable and unstable regions in a $\beta_{av}$ versus indentation diagram. In a conventional tokamak—one in which the indentation is low or non-existent—a plasma will remain stable to ballooning modes provided the beta lies below the threshold of the instability, curve A. At higher $\beta$ there is another threshold, curve B, above which the plasma can be stable again. This regime is generally called the second region of stability. The unstable region provides a barrier against operating a conventional tokamak at high beta. However, this barrier can be circumnavigated if the plasma is indented sufficiently to a critical indentation such that curves A and B intersect at point C in the figure. Starting at that value of the indentation, we see that accessibility to the second region of stability is achieved. Another way of looking at point C, is that this represents the point beyond which no ideal ballooning modes exist. Also, as can clearly be seen from FIG. 4, the first and second regions join for d/2a larger than the critical value. A possible regime of tokamak operation could be at point D.

Figure 3A:
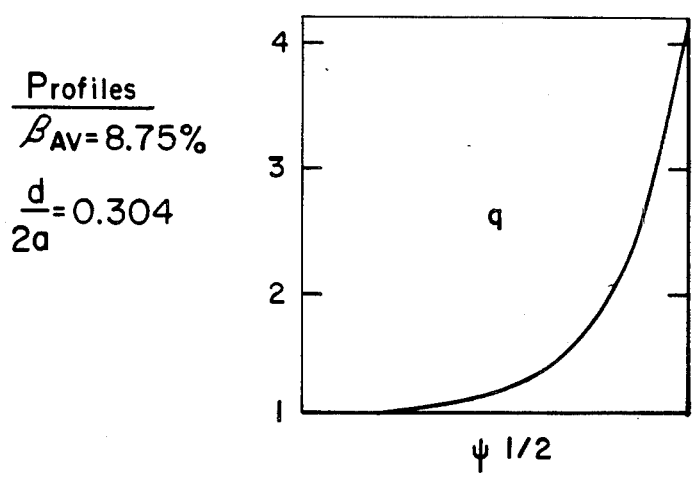
FIGS. 3a through 3c show typical profiles used in plasma stability calculations.
Figure 3B:
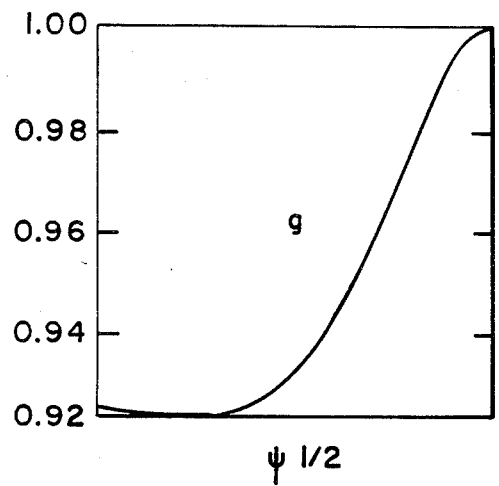
Figure 3C:
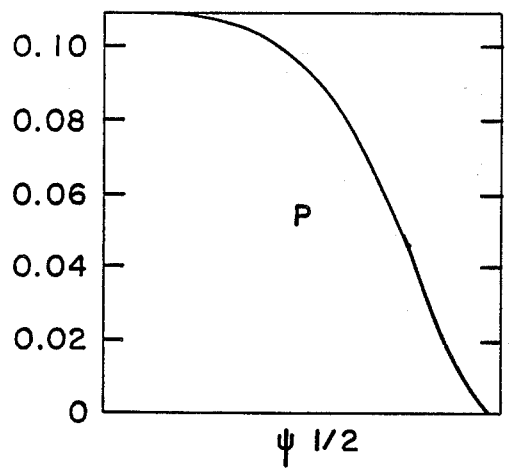

As a specific example, a study of the effect of bean-shaping has been carried out by examining, using numerical solutions to the aforementioned ballooning equation, the stability of a class of equilibria whose plasma surface shape in the poloidal cross section is parametrized by the formula in equation (3)

$$x(t) = \bar{x} + \rho \cos \gamma,$$

$$z(t) = E\rho \sin \gamma,$$

where $\rho = A(1 + B \cos t)$, $\gamma = C \sin t$, and $0 \leq t \leq 2\pi$. An example of this shape is given in FIG. 1 with $A=1$, $B=0.6$, $C=97°$, and $E=0.895$. The fixed boundary solutions of the Grad-Shafranov equation are computed from a flux-coordinate code operating in the mode in which we fix the safety factor, $q(\psi)$ and pressure profile $p(\psi)$. These are taken to be $$q(y) = \sum_{i=0}^{3} q_i y^i \qquad (6)$$

and $$p(y) = p_o(1-y^2)^2, \qquad (7)$$

where $0 \leq i \leq 3$ and $y = \psi/\Delta\psi$, $2\pi\Delta\psi$ being the poloidal flux within the plasma. The coefficients $q_i$ are specified for this example such that $q(0)=1.03$, $q(1)=4.2$, $q'(0)=0.84$, $q'(1)=9.0$. The profiles for saftey factor, toroidal field, and pressure are shown in FIGS. 3a–3c respectively.

Figure 5:
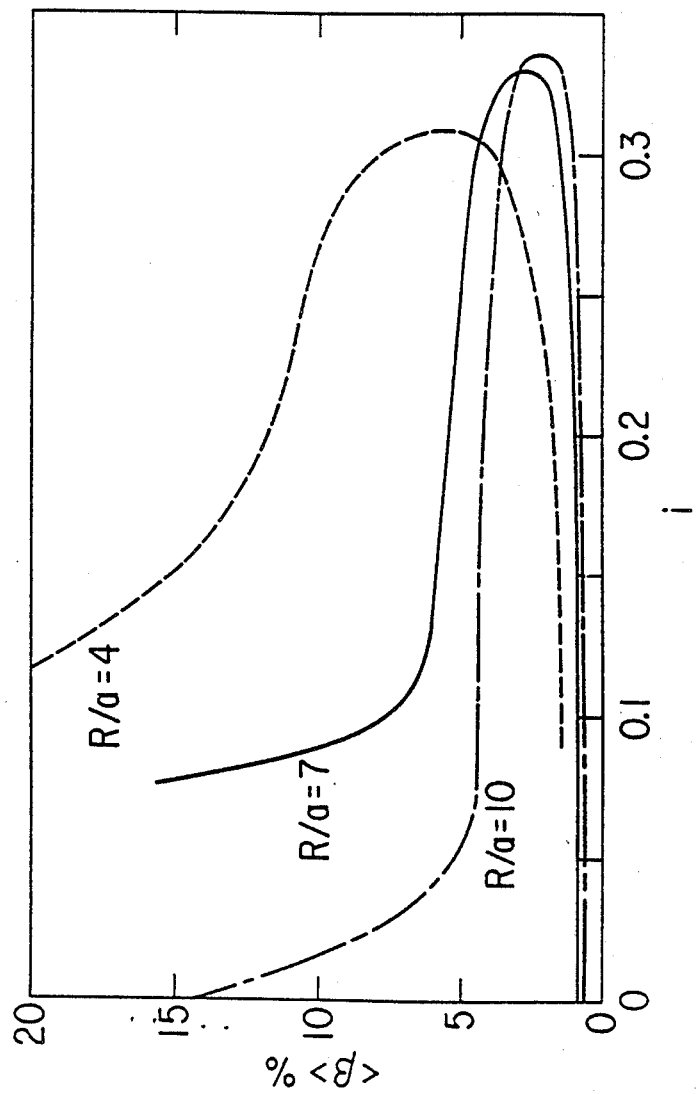
FIG. 5 shows the results of a calculation of the stability boundary to infinite-n ballooning modes as a function of plasma indentation and plasma beta for a representative set of plasma parameters.

Sequences of flux-conserving equilibria at fixed values of indentation are generated by varying the parameter $p_o$. Each of these equilibria is examined for ballooning stability by solving Eq. (4). FIG. 5 shows the advantage of bean shaping in the stabilization process for a PBX-like tokamak with aspect ratios of 4, 7, and 10. Note that the unstable region is compressed with increasing aspect ratio. As shown in the figure, at low indentation an inorease of $\beta_{av} = 2\int pdv/\int B^2 dv = 2p_{av}/B^2_{av}$ (obtained by increasing $p_o$) causes the plasma to become balloon unstable, but further increasing the pressure places the plasma in the so-called second stability regime. Moreover, if the indentation is large enough, the plasma can bypass completely the unstable region as the pressure is increased. Bean shaping thus provides an accessible path to the second region of stability for ballooning modes. For R/a=4, the critical indentation is 0.304, when R/a=7, critical indentation is 0.33, when R/a is 10, critical indentation is 0.35.

Aspect Ratio Scaling

Figure 6:
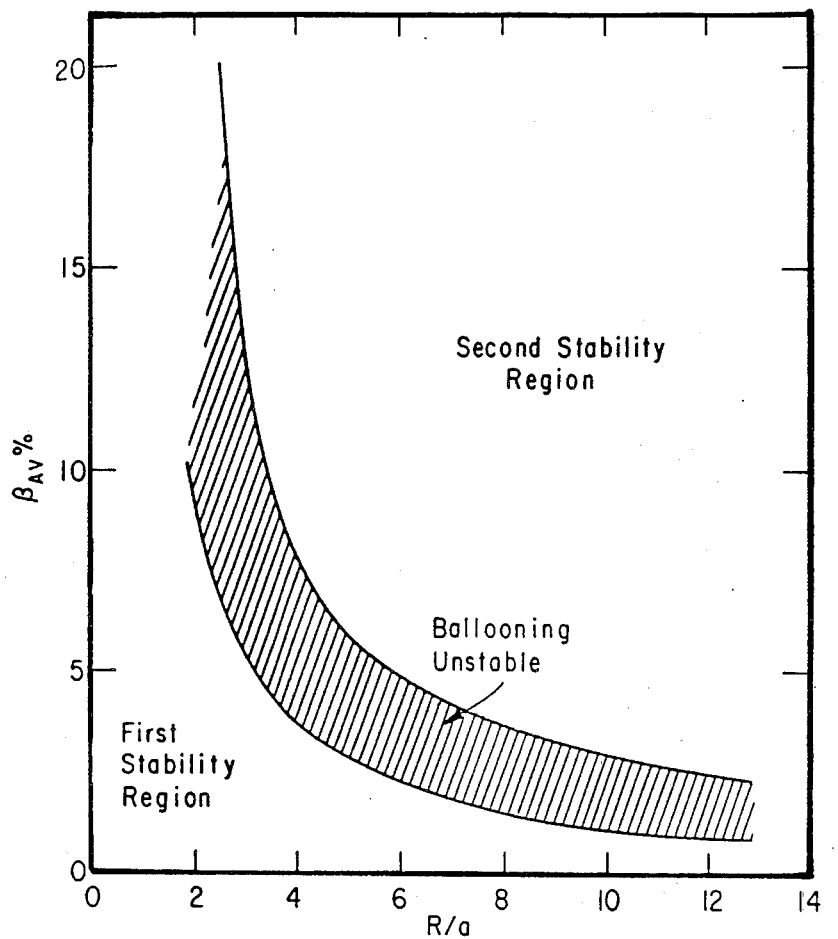
Figure 7A:
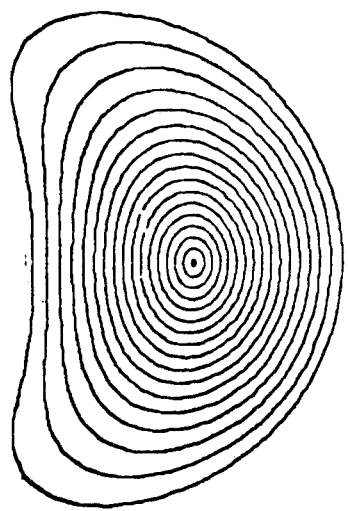
FIGS. 7a through 7f show midplane profiles of $J_\phi$ for different indentation and plasma betas.
Figure 7B:
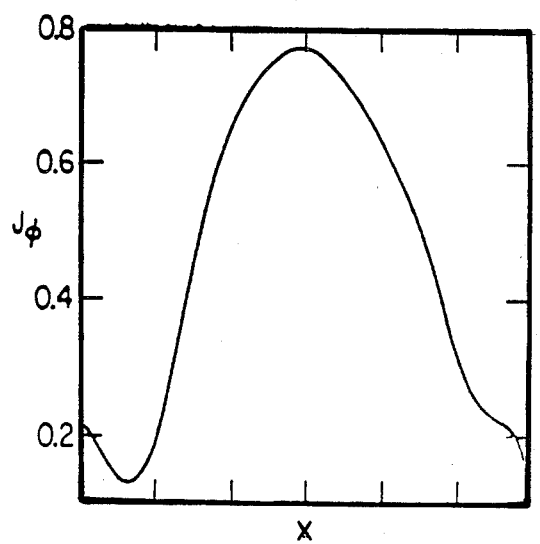
Figure 7C:
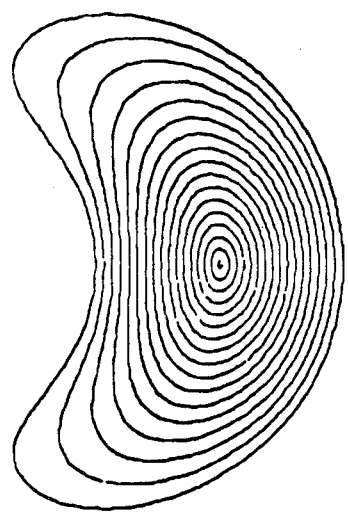
Figure 7D:
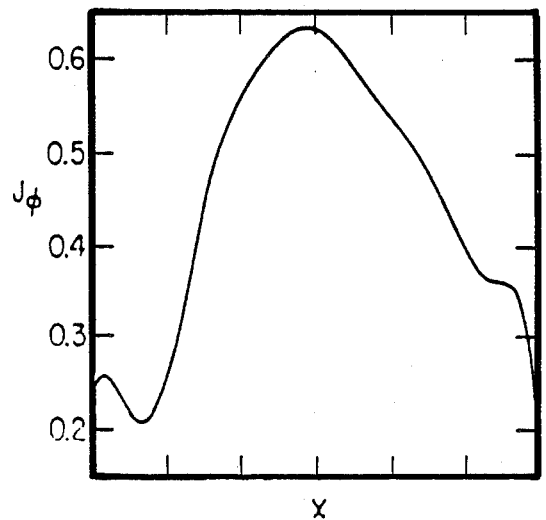
Figure 7E:
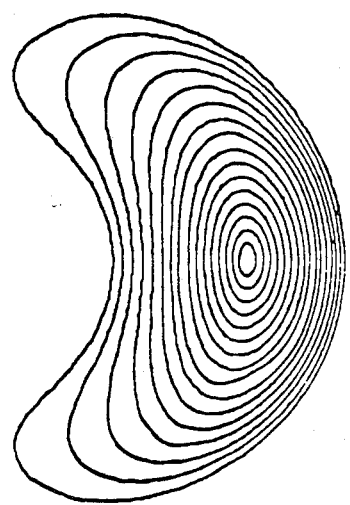
Figure 7F:
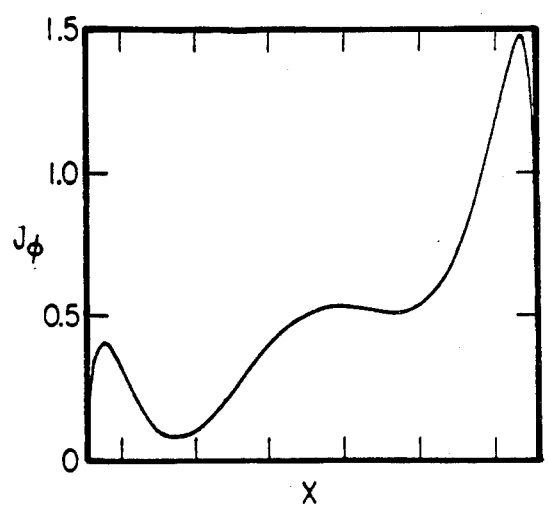

The effect of varying the aspect ratio, R/a, is shown in FIG. 6 for a plasma with indentation fixed at d/2a=0.304 (C=97°) and for the pressure profiles, $p(\psi)$, and the safety factor profiles, $q(\psi)$, cited in equations 6 and 7 above. There we see that while higher stable $\beta$ values in the first region are obtained with lower aspect ratios, the second regime becomes increasingly remote. At R/a=2 equilibria up to $\beta_{av}$ 80% are still unstable. As the aspect ratio is increased, the unstable region decreases making it appear more likely that operation above the ballooning limit should be possible. For this case, in which the indentation is still slightly smaller than the critical value, the unstable region does not vanish, as in FIG. 5, at least out to $R/a \sim 20$, which is as far as present calculations have been performed.

FIGS. 7a–7f illustrate some of the features of the current profile associated with the choice of q(0)=1.03, q(1)=4.2, q'(0)=0.84, q'(1)=9.0. Comparison of FIG. 7b with 7d indicates the variation with indentation at low $\beta$ (0.1%), while FIG. 7d and FIG. 7f ($\beta \sim 10\%$) illustrate the effect of varying $\beta$ at similar indentation.

THE INTERNAL KINK MODE

The use of bean-shaping (indentation) is also beneficial toward stabilizing the internal kinks for which n=1. Here n is the toroidal mode number in the Fourier decomposition of the plasma displacement:

$$\underline{F} = \underline{F}_{l,n} \exp i (l\theta - n\phi).$$

Calculations at Large Aspect Ratio

In this first series of calculations the marginal stability contours for R/a=10 plasmas are compared with circular, elliptical, dee-shaped, and indented cross sections. The results are shown in FIG. 8.

Figure 8:
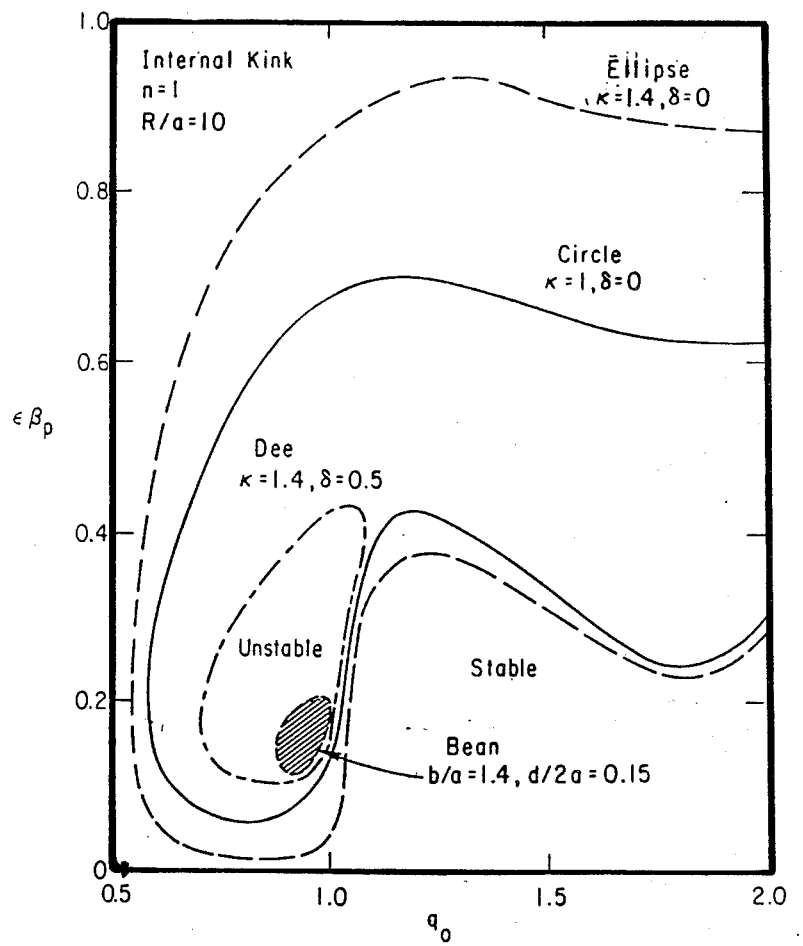
FIG. 8 shows stability boundaries through the internal l=1, n=1 kink mode, for a variety of plasma cross-sections at R/a=10.
Figure 9:
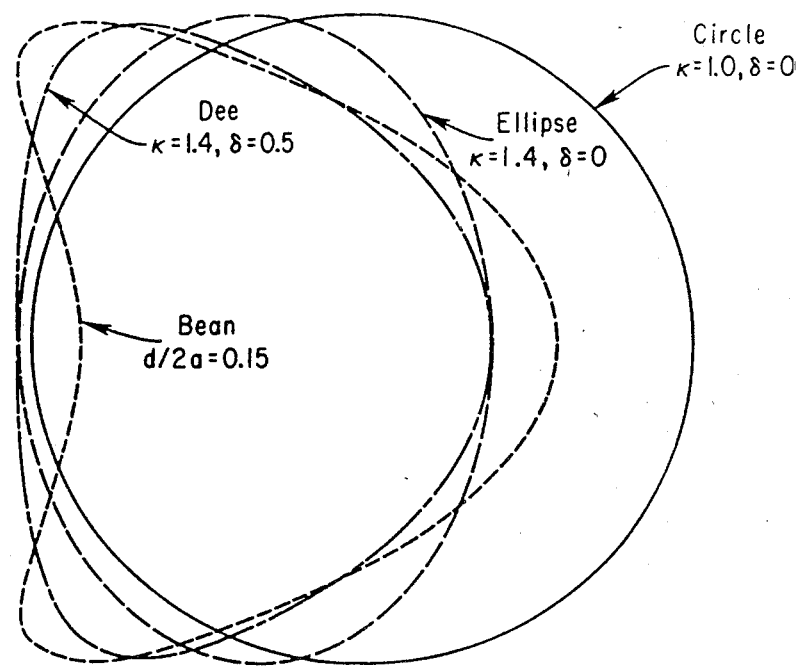
FIG. 9 shows cross-sectional shapes used in FIG. 8.

To produce FIG. 8, sequences of fixed boundary equilibria were generated with identical p and q profiles. The boundary shape was $$X(\theta) = R - B + (a+B \cos \theta) \cos (\theta + \delta \sin \theta)$$

$$Z(\theta) = E \, a \sin \theta, \qquad (8)$$

and FIG. 9 shows the cross sections of the four different shapes studied in FIG. 8. The calculations used $p(y) = -p_o(1-y)^{2.5}$, $q(y) = q_o + q_\beta y^2$, with $y \equiv \psi/\Delta\psi$ as before. $q_o$ and $q_\beta$ were chosen such that $q_{edge}/q_{axis} \sim 2.5$. Each member of the sequences so generated was then scaled to lower q values at fixed $\beta$ poloidal. This procedure generates a mesh of equilibria so that one can map out a region in the parameter space defined by q(0) and $\epsilon\beta_{pol}$, as shown in FIG. 8. Here $\epsilon$ is the inverse aspect ratio and $\beta_{pol}$ in the $\beta$ of the plasma referred to the poloidal field. Each member of this mesh of equilibria was then analyzed by computer for stability to internal modes with n=1.

The results of FIG. 8 demonstrate that shaping the plasma surface has a strong effect on the n=1 internal kink. For circular and elliptical plasmas, the n=1 mode can be unstable for a wide range of $\epsilon\beta_{pol}$ even without a q=1 surface inside the plasma. This is a pressure driven large wavelength ballooning-like mode. When q(0)<1, the mode becomes an internal kink. It is stabilized at sufficiently high $\epsilon\beta_{pol}$. We note that ellipticity is destabilizing. The region of instability is seen to shrink considerably with the introduction of triangularity for the D-shaped plasma and the bean.

Calculations for PBX Parameters

Figure 10:
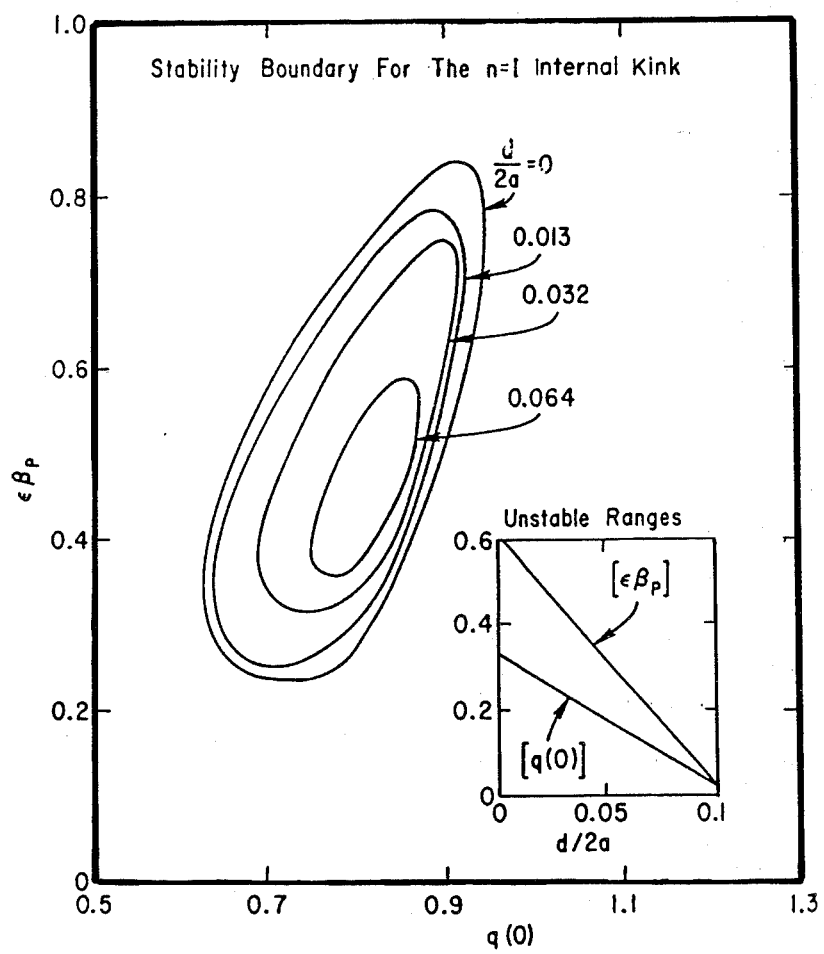
FIG. 10 shows a stability boundary of the internal kink mode for R/a=4 wherein stabilization increases with indentation. The cross-sectional shapes are those described in FIG. 1.

Using sequences of equilibria generated above ("Indentation and Accessibility to very High-$\beta$") with an aspect ratio of 4, the procedure described immediately above was followed to determine the explicit stabilizing effect of indentation as envisioned in the PBX experiment (Princeton Beta Experiment device located at the Princeton Plasma Physics Laboratory in Princeton, N.J.). The results are shown in FIG. 10, which shows regions of instability on the $q_o - \epsilon\beta$pol plane for several values of indentation. For comparison with FIG. 5, it is noted that the indentations chosen are all less than the first sequence of ballooning results at d/2a≅0.1. The most unstable shape corresponds to a D-shaped plasma with essentially vertical inboard plasma surface. It is seen that even small indentations are quite stabilizing. The inset on FIG. 10 shows the variation of the height and width of the unstable region as a fuction of indentation. The critical indentation for complete stability to this mode is shown to be d/2a=0.1. Consistent with this, all equilibria shown explicitly on FIG. 4 are stable to the internal n=1 kink mode, even with q(0) as low as ½.

Figure 11:
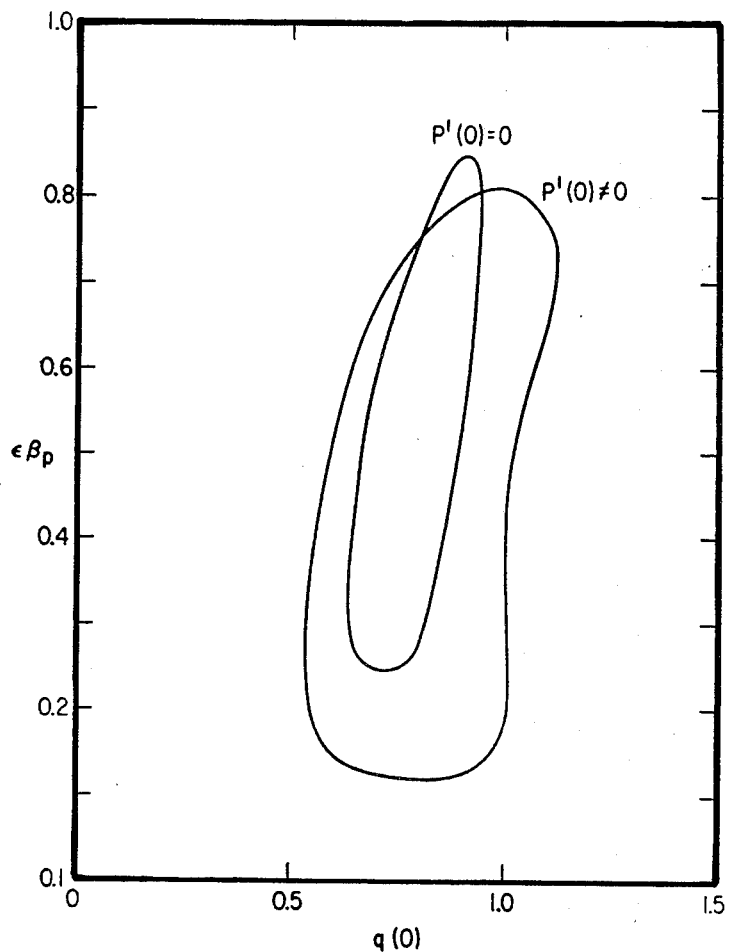
FIG. 11 shows boundary stability for the internal n=1 kink mode for a D-shaped plasma with two different pressure profiles.

The results of FIG. 10 were obtained with the flat pressure profile given above, which has p'(0)=0. While the internal kink stability boundary can be sensitive to the variation of plasma profiles, it is not believed that this choice is responsible for the stabilization, since the favorable effect of bean shaping was already seen in the calculations presented in the previous section which had finite p'(0). To be more specific with respect to PBX, this concept was tested on the most unstable shape of FIG. 10 (the Dee) by changing the pressure profile to $p(y)=p_o(1-y)^2$, i.e., more peaked near the magnetic axis as compared with the profile described by equation 7. The results are shown in FIG. 11. As expected, this peaked profile is more unstable, especially when the q=1 surface is near the magnetic axis. Thus, while flattening the pressure profile certainly reduces the region of instability, indenting the cross section is the principal stabilizing ingredient.

Figure 12:
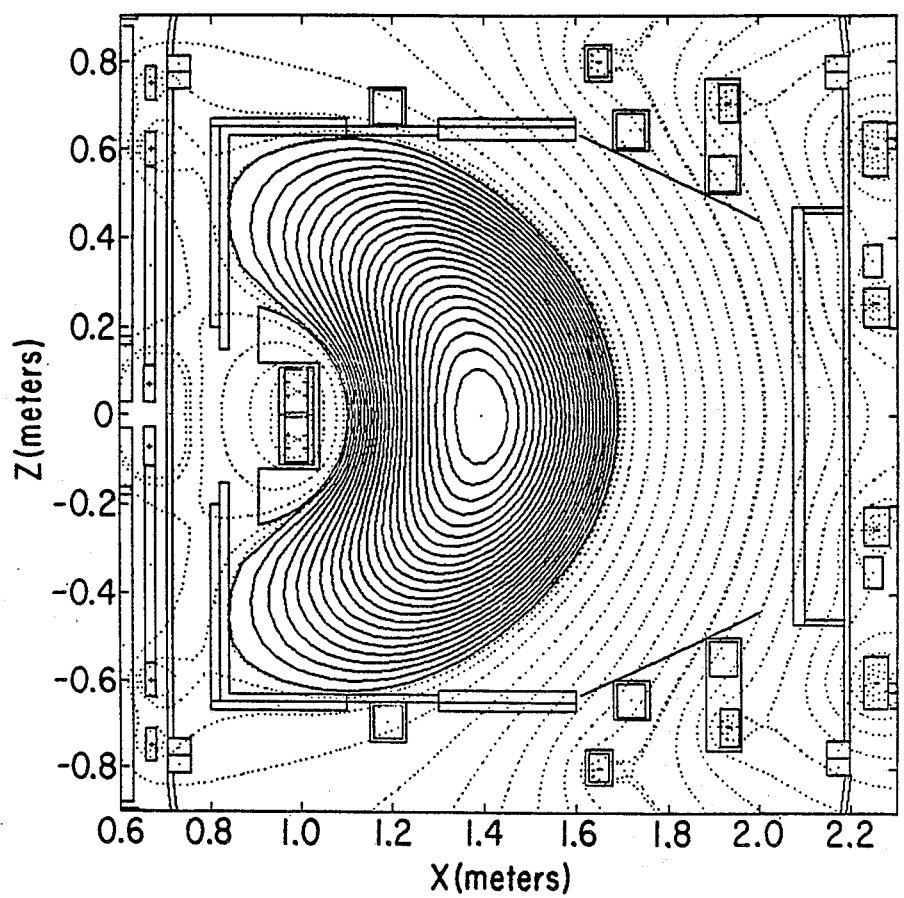
FIG. 12 shows a numerical simulation of the plasma cross-section as envisioned in the actual PBX device.

An example of a high-$\beta$ equilibrium (~10%) with typical parameters for the PBX experiment is shown in FIG. 12. Stability studies have shown that this configuration is stable against the internal (n=1) kink at least as high as $\beta \sim 20\%$, and against ballooning modes to $\beta \sim 9\%$. The values are in marked contrast with $\beta_c = 1.4\%$ (internal kink) and $\beta_c = 2.7\%$ (ballooning) previously reported by D. Johnson et al., Plasma Physics and Controlled Nuclear Fusion Research 1982, Vol. 1, IAEA, Vienna (1983) 1, for PDX circular high $\beta$/low q discharges. A convenient and efficient way to achieve the desired shaping of the poloidal cross-section of the plasma, including the inner side of the cross-section, is by energizing a pusher coil, or a set of pusher coils, located on or near the central plane and close to the plasma. Such a set of pusher coils is illustrated in FIG. 12, where this concept was applied to the PBX device at Princeton. The pusher coils work together with the other external coils for the tokamak to create the indented shape, but the pusher coils' proximity to the plasma makes their contribution to the shaping of the dominant one.

The pusher coil current may also be programmed in time to achieve the amount of indentations appropriate to the instantaneous magnitude and profiles of the current and pressure.

The above description of embodiments of the invention is given by way of example only and it should be understood that numerous modifications can be made therein without departing from the scope of the invention.

The embodiments of this invention in which an exclusive property or privlege is claimed are defined as follows:

1. A method of operating a toroidal magnetic confinement device for confining a plasma, said plasma having a magnetic field B associated therewith, said magnetic field having an average magnetic pressure, $B_{av}^2/2$, and said plasma having a pressure p, said pressure having an average value, $p_{av}$, wherein $B_{av}^2 = \int B^2 d\tau / \int d\tau$, and $p_{av} = \int p d\tau / \int d\tau$, integration being over the plasma volume, said magnetic field and pressure defining a beta, $\beta$, associated with said plasma wherein $\beta = 2 p_{av}/B_{av}^2$, and said plasma having a first and a second region of stability and a region of instability therebetween, said method comprising the steps of:
   (a) modifying the shape of said plasma until said plasma has a bean-shaped poloidal cross-section, a measure of said bean-shape being hte indentation at the inner most point on the plasma at the inboard side of the poidal cross-section;
   (b) maintaining said beta below the threshold for instability for operation in the first region of stability, while increasing said indentation to a critical value, said critical value being the value at which said second region of stability is accessed from said first region of stability without entering said region of instability; and
   (c) increasing said beta until a desired value of beta in said second region of stability is attained while maintaining said indentation at said critical value or greater.

2. The method of claim 1 further comprising the step
   (d) reducing said indentation to a value less than said critical value and large enough to maintain said desired value of beta in said second region of stability.

3. The method of claim 1 wherein said plasma has plasma pressure profiles p(y) satisfying the relationship: $p(y)=p_o(1-y^2)^2$, where $p_o$ is a constant, $y=\psi/\Delta\psi$ and $2\pi\Delta\psi$ is the poloidal flux in the plasma.

4. The method of claim 1 wherein said plasma has a safety factor profile q(y) satisfying the relationship:

$$q(y) = \sum_{i=0}^{3} q_i y^i,$$

where $q_i$ are constants, $y=\psi/\Delta\psi$ and $2\pi\Delta\psi$ is the poloidal flux in the plasma.

5. The method of claim 1 wherein the shape of said plasma cross-section is given by $$x(t) = \bar{x} + \rho \cos \gamma,$$

$$z(t) = E\rho \sin \gamma$$

where $\rho = A(1B \cos(t))$, $\gamma = C \sin(t)$ and $0 \leq t \leq 2\pi$, and A, B, C, E, and $\bar{x}$ are constants.

6. The method of claim 1 wherein beta is adjusted by varying at least one of $p_{av}$ and $B_{av}^2$.

7. The method of claim 1 wherein said plasma has a plasma pressure profile p(y) and safety factor profile q(y) satisfying the relationships:

$$p(y) = p_o(1 - y^2)^2,$$

$$q(y) = \sum_{i=0}^{3} q_i y^i,$$

where $p_o$, $q_i$ are constants, $y=\psi/\Delta\psi$, $2\pi\Delta\psi$ is the poloidal flux in the plasma.

8. The method of claim 7 wherein said device has an aspect ratio of 4 and said critical value is about 0.304.

9. The method of claim 7 wherein said device has an aspect ratio of 7 and said critical value is about 0.33.

10. The method of claim 7 wherein said device has an aspect ratio of 10 and said critical value is about 0.35.

11. The method of claim 7 wherein said device is a tokamak.

12. A method of operating a toroidal magnetic confinement device, for confining a plasma, said plasma having a first and a second region of stability and a region of instability therebetween, said method comprising the steps of:

(a) applying a magnetic field B to said device, said field having an average magnetic pressure $B_{av}^2/2$, where $$B_{av}^2 = \int B^2 d\tau / \int d\tau;$$

(b) forming a plasma within said device, said plasma having a bean-shaped poloidal cross-section, a measure of said bean-shape being the indentation at the innermost point on the plasma at the inboard side of the poloidal cross-section, wherein said indentation is equal to at least a critical value, said critical value being the value at which said second region of stability is accessed from said first region of stability without entering said region of instability, said plasma having a pressure p, said pressure having a average value $p_{av}$, where $$p_{av} = \int p d\tau / \int d\tau;$$

(c) increasing beta, $\beta$, to a desired value in said second region of stability where $$\beta = \frac{2p_{av}}{B_{av}^2}.$$

13. The method of claim 12 further comprising the step (d) reducing said indentation to a value less than said critical value and large enough to maintain said desired value of beta.

14. The method of claim 13 wherein said device is a tokamak.

15. The method of claim 14 wherein said plasma has pressure profiles p(y) satisfying the relationship:

$$p(y) = p_o(1-y^2)^2,$$

where $p_o$ is a constant, $y = \psi/\Delta\psi$, and $2\pi\Delta\psi$ is the poloidal flux in the plasma.

16. The method of claim 15 wherein said plasma has a safety factor profile q(y) satisfying the relationship:

$$q(y) = \sum_{i=0}^{3} q_i y^i,$$

where $q_i$ are constant.

17. The method of claim 16 wherein the shape of said plasma cross-section is given by $$x(t) = \bar{x} + \rho \cos \gamma,$$

$$z(t) = E\rho \sin \gamma,$$

where $\rho = A(1 + B \cos t)$, $\gamma = C \sin(t)$, and $0 \leq t \leq 2\pi$, and A, B, E, C, $\bar{x}$ are constants.

18. The method of claim 12 wherein said bean shaped cross-section is formed by energizing a pusher coil located at the inner major radius side of the plasma.

19. The method of claim 12 wherein beta is established by varying at least one of $p_{av}$ and $B_{av}^2$.

20. The method of claim 1 wherein said bean-shaped cross-section is formed by energizing a pusher coil located at the inner major radius side of the plasma.

21. The method of claim 18 wherein the pusher coil is located in the vicinity of the indentation and is energized by an external current source.

22. The method of claim 20 wherein the pusher coil is located in the vicinity of the indentation and is energized by an external current source.

23. The method of claim 21 wherein the magnitude of the current through the pusher coil varies with time.

24. The method of claim 22 wherein the magnitude of the current through the pusher coil varies with time.

* * * * *